June 12, 1923.
W. G. COX
END SHIELD FOR MOTOR VEHICLES
Filed March 14, 1923    2 Sheets-Sheet 1
1,458,277
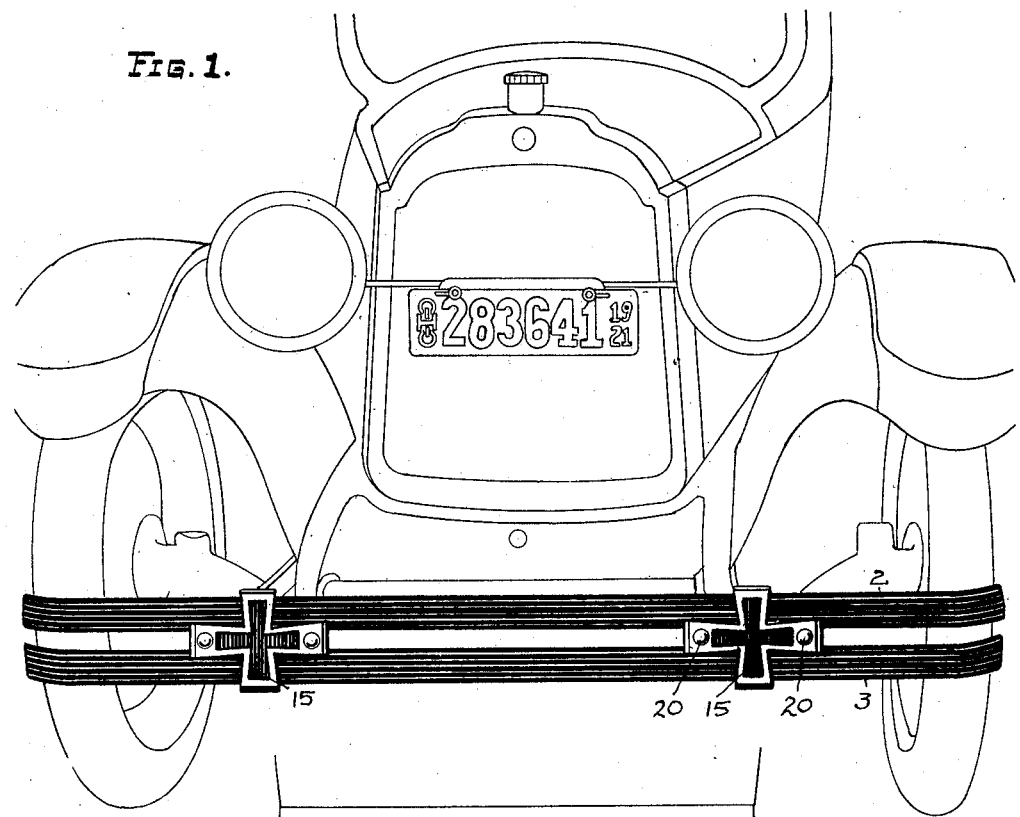
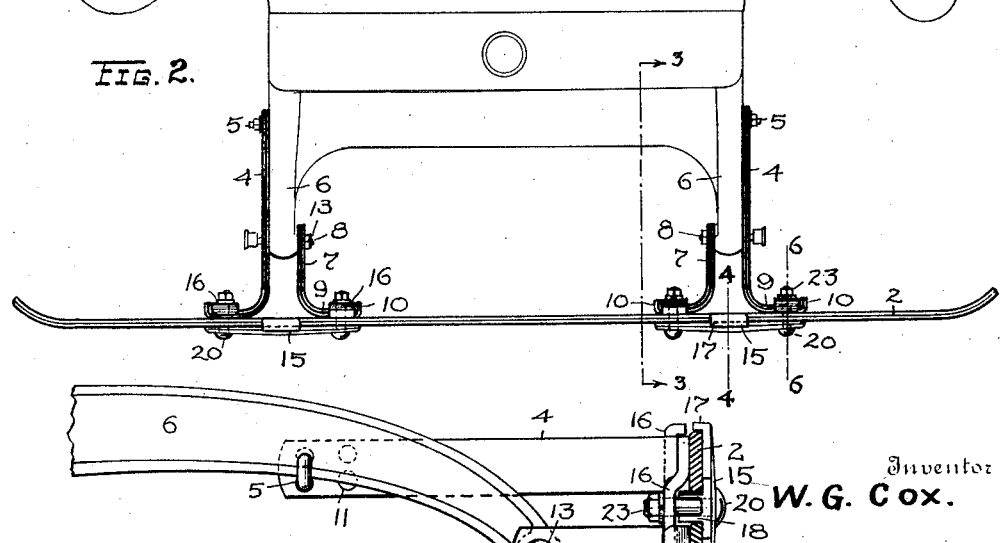
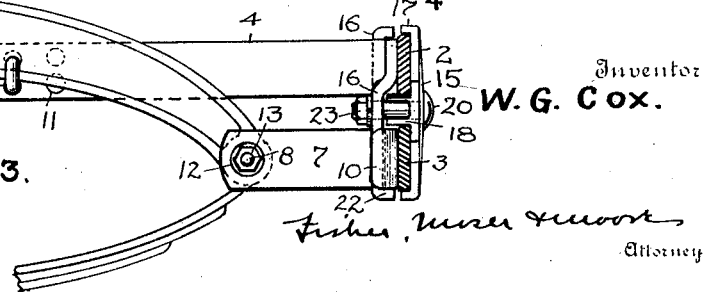
Inventor
W. G. Cox.
Attorney June 12, 1923.
W. G. COX
1,458,277
END SHIELD FOR MOTOR VEHICLES
Filed March 14, 1923    2 Sheets-Sheet 2
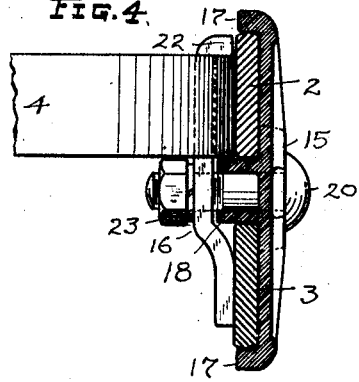
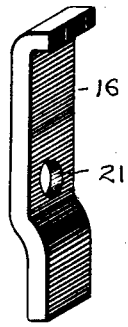
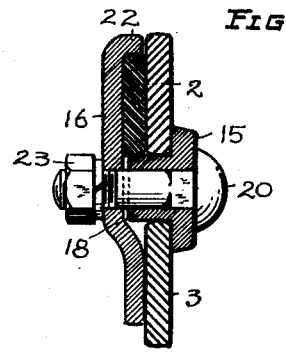
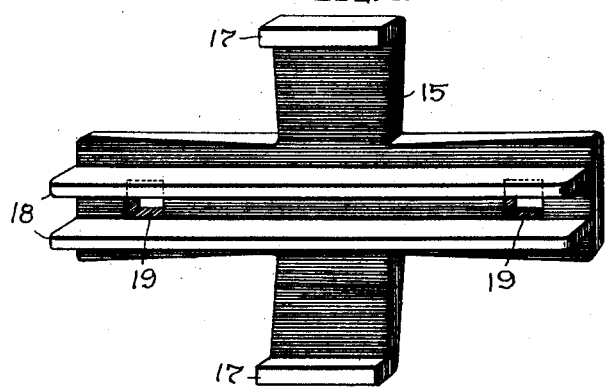
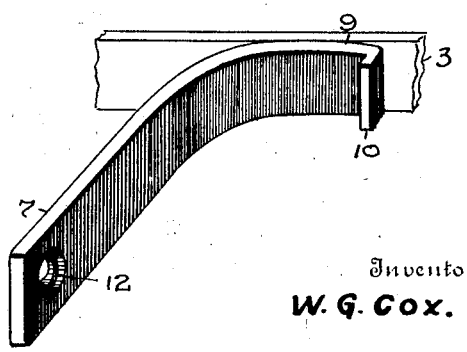
Inventor
W. G. Cox.
By Fisher, Moser Moore
Attorneys Patented June 12, 1923.

1,458,277

UNITED STATES PATENT OFFICE.

WILLIAM G. COX, OF CLEVELAND, OHIO.

END SHIELD FOR MOTOR VEHICLES.

Application filed March 14, 1923. Serial No. 624,895.

*To all whom it may concern:*

Be it known that I, WILLIAM G. COX, a citizen of the United States, residing at Cleveland, in the county of Cuyahoga and State of Ohio, have invented certain new and useful Improvements in an End Shield for Motor Vehicles, of which the following is a specification.

My principal aim or purpose is to provide a broad-faced shield or guard which may be readily affixed upon the ends of motor vehicles in general use to ward off collisions and prevent damage to the vehicle and possible injury to its occupants. More specifically, my object is to support a pair of flat buffer rails horizontally in the same vertical plane at the front end of a motor vehicle by affixing a double set of attachment arms to the longitudinal extensions of the vehicle frame and using coupling and clamping devices to connect the companion arms of each set rigidly together and in adjustable clamping engagement with the rails. As constructed, the coupling devices also serve as spacing and aligning members for the rails and arms, as buffer plates, and as decorative escutcheons.

In the drawings accompanying this application, Fig. 1 is a perspective view of the front end of an automobile equipped with my improved end shield. Fig. 2 is a top view of the shield attached to the projecting ends of the side members of the vehicle frame. Fig. 3 is an enlarged side view and vertical section on line 3—3 of Fig. 2. Fig. 4 is a vertical section on a still larger scale of the shield on line 4—4 of Fig. 2. Fig. 5 is a perspective view of one of the clamping pieces. Fig. 6 is a section of the shield on line 6—6 of Fig. 2. Fig. 7 is a perspective view of the rear clamping side of the coupling plate. Figs. 8 and 9 are perspective views of a part of companion attachment arms for the shield.

The shield or guard comprises two flat rails or bars 2 and 3, respectively, of the same length, breadth and thickness, preferably slightly curved rearwardly at their opposite ends and shown straight between said ends, although each rail may be curved or slightly bowed its full length. The rails are preferably made of spring steel, but heavier wood bars may be substituted if desired. These two rails are supported horizontally in parallel spaced relation edge to edge one above the other upon duplicate sets of attachment arms, each set comprising a long flat arm 4 adapted to be secured by suitable bolts 5 to the outer face of the channeled side member 6 of the motor vehicle frame, and a relatively shorter arm 7 adapted to be affixed to the spring shackle bolt 8 at the inner side of the same member 6. In this way the two arms are spaced apart and extend forwardly on substantially parallel lines, but their respective front ends are curved laterally in opposite directions to provide short flat clamping extensions 9 having right-angled lips 10 at their extremities. The longer arm 4 is preferably provided with a group of bolt holes 11 for bolt 5, and the shorter arm 7 is formed with a counter-sunk recess and opening 12 to receive the shackle bolt 8 and its detachable nut 13. The channeled side members 6 of the vehicle frame are curved or slanted downwardly at their ends, and therefore, in attaching the two arms the longer arm 4 may be mounted upon the frame at a higher elevation than the shorter arm 7 and the two arms may extend forwardly on parallel lines to place the flat clamping extremities 9 at different elevations but in the same vertical plane, see Fig. 3.

Thus, the separate attachment arms may be used to support separate buffer rails at different elevations, the upper buffer rail 2 in the present instance being engaged at its rear side by the longer arms 4 and the lower rail 3 being backed by the shorter arms 7. However, to provide a rigid support for the rails the two arms 4 and 7 in each set require a connection and the rails must be securely fastened in place. As shown, this is accomplished by employing coupling plates 15 for the attachment arms and clamping devices 16 for the rails, and the plates and clamping devices are constructed to be used together to space and align the rails and arms. To that end each coupling plate is made in the form of a cross, the vertical arms of the cross having right-angled extremities 17 extending rearwardly over the edges of the rails, and the rear sides of the horizontal arms of the cross having parallel ribs 18 extending rearwardly between the two rails. The outer end of each horizontal arm of the cross is further provided with a square opening 19 to receive the square neck of a clamping bolt 20, and the clamping device 16 is in the form of a metal strap having a bolt opening 21 adapted to receive bolt 20. A forwardly-extending lip 22 at one end of device 16 overlaps the edge of the attachment arm when this arm is clamped between device 16 and the rail, and the opposite end of clamping device 16 is bent forwardly to permit fulcrum engagement with the rear side of the rail directly opposite thereto. Two such clamping devices 16 are used, one for each arm 4 and 7, respectively, but inasmuch as the clamping extension 9 of arm 4 is directly engaged with the upper rail 2 and the extension of arm 7 with the lower rail 3 the two clamping devices are reversely related, that is to say, one has fulcrum engagement with the lower rail and the other fulcrums against the upper rail. Thus when the nuts 23 for the clamping bolts 20 are tightened the two rails are clamped in parallel alignment with and against the clamping extensions of the two attachment arms 4 and 7 respectively, and the bent extremities 10 of extensions 9 prevent lateral displacement or slip relatively between the attachment arms and the clamping devices. Such clamping of the parts may take place at different places longitudinally of the bars dependent upon where the coupling plates and attachment arms are located, thereby permitting the attachment arms and coupling plates to be attached to vehicle frames of different width and the rails clamped in place frictionally.

Coupling plates 15 may be fashioned in various ways to permit connection to be made between the companion attachment arms, and the rails, that is, the cross shape of this plate is only one exemplification of such a tie or connection for both the arms and the rails. However, I prefer to use an ornamental design or configuration of coupling plate to embellish the shield or guard as a whole and make it distinctive and attractive. These plates also serve as buffer plates and escutcheons. In affixing a shield or guard of this type upon the rear end of a motor vehicle the shorter arms 7 would be bolted or clamped to the inner sides of the extending portions of the frame, but not necessarily to any part of the shackle fittings for the suspension springs. However, it is desirable to make the companion arms of each set of different length or clamp them at different points longitudinally of the vehicle frame extensions to effect rigid bracing of the two arms and a stable support for the rails.

What I claim, is:

1. A broad-faced shield or guard for a motor vehicle, comprising a pair of parallel buffer rails, separate pairs of attachment arms for said rails, and a connecting plate for each pair of attachment arms in clamping engagement with the front sides of said rails.

2. A broad-faced shield or guard for a motor-vehicle, comprising a pair of parallel buffer rails, separate sets of attachment arms for said rails, and clamping plates for said rails rigidly connecting the arms of each set in spaced relation.

3. A broad-faced shield or guard for a motor-vehicle, comprising separate buffer rails, separate attachment arms for each rail, each rail and its attachment arms lying in a different horizontal plane than the other rail and its attachment arms, and clamping plates connecting said arms and rails.

4. A broad-faced shield or guard for a motor-vehicle comprising vertically spaced buffer rails, separate attachment arms lying adjacent each other in different horizontal planes for each rail, and means connecting the adjacent arms together in clamping engagement with said rails.

5. A broad-faced shield or guard for a motor-vehicle comprising a pair of buffer rails, a pair of clamping plates for said rails, independent attachment arms backing the opposite end portions of each rail, and means uniting each plate and a pair of backing arms to each other and both rails.

6. A broad-faced shield or guard for a motor-vehicle, comprising a pair of buffer rails, separate pairs of complementary attachment arms backing contiguous end portions of said rails, and clamping plates for said rails having horizontally-extending portions detachably connected with each pair of attachment arms.

7. A broad-faced shield or guard for a motor-vehicle, comprising a pair of buffer rails, two pairs of complementary attachment arms having lateral extremities engaging the backs of said rails, a connecting plate for each pair of complementary arms frictionally engaged with the front side of both rails, and clamping means detachably connecting each plate and a pair of said arms together.

8. A broad-faced shield or guard for a motor-vehicle, comprising a pair of buffer rails, a pair of attachment arms at each end of said rails, a connecting plate for each pair of arms having spacing portions extending between said rails, and separate clamping devices for said rails at the opposite ends of each plate.

9. A broad-faced shield or guard for a motor-vehicle, comprising a pair of spaced buffer rails, a pair of horizontally-extending clamping plates at the front sides of said rails opposite the space between the rails, and supporting arms for said rails detachably affixed to the opposite ends of each clamping plate.

10. A broad-faced shield or guard for a motor-vehicle comprising spaced buffer rails, separate coupling plates having spacing and aligning portions for said rails, supporting arms having bent portions bearing against the rear sides of said rails and engaging said aligning portions on said plates, and means connecting said arms and rails and plates rigidly together.

11. A broad-faced shield or guard for a motor-vehicle, comprising spaced buffer rails, separate coupling plates having vertical portions engaging the front sides of said rails and horizontal portions extending in front of the space between the rails, supporting arms engaged with the rear sides of said rails, and clamping devices for said rails and arms connected with the horizontal portions of said plates.

12. A broad-faced shield or guard for a motor-vehicle, comprising a pair of spaced buffer rails, a pair of coupling plates having spacing and aligning portions for said rails, separate attachment arms having curved extremities bearing against the rear side of each rail, clamping devices engaging said arms and rails, and clamping bolts connecting said devices with said plates.

13. A broad-faced shield or guard for a motor-vehicle, comprising a pair of buffer rails, separate pairs of attachment arms for said rails, cross-shaped coupling plates for each pair of attachment arms at the front side of said rails, and means uniting said arms and rails and plates detachably together.

14. A broad-faced shield or guard for a motor-vehicle, comprising a pair of buffer rails; separate attachment arms for said rails; coupling plates adapted to engage the front side of said rails; and separate clamping devices for said rails, each having one end in fulcrum engagement with one of said rails and the opposite end engaging an arm.

15. A broad-faced shield or guard for a motor-vehicle, comprising a pair of buffer rails; a pair of attachment arms for each rail, each arm having a straight rear end and a curved laterally-extending front end terminating in a short lip; a pair of coupling plates, each having spacing and confining portions for said rails; a clamping device for each arm; and clamping bolts connecting a pair of said devices with each coupling plate.

In testimony whereof I affix my signature hereto.

WILLIAM G. COX.

Witness:
DOROTHY M. MOSER.